July 23, 1929.  C. A. HAWKINS  1,721,732
VEHICLE SUSPENSION
Filed May 27, 1926  2 Sheets-Sheet 1
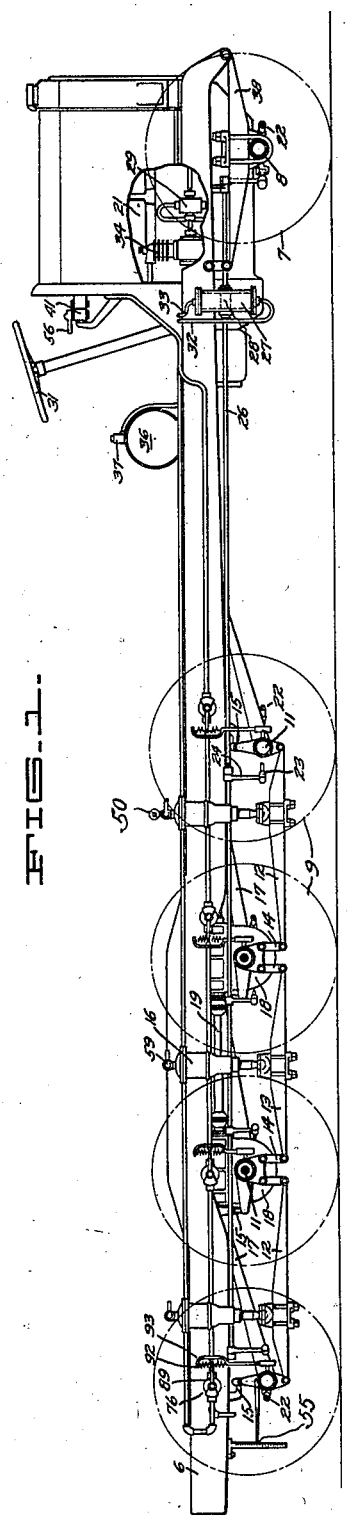
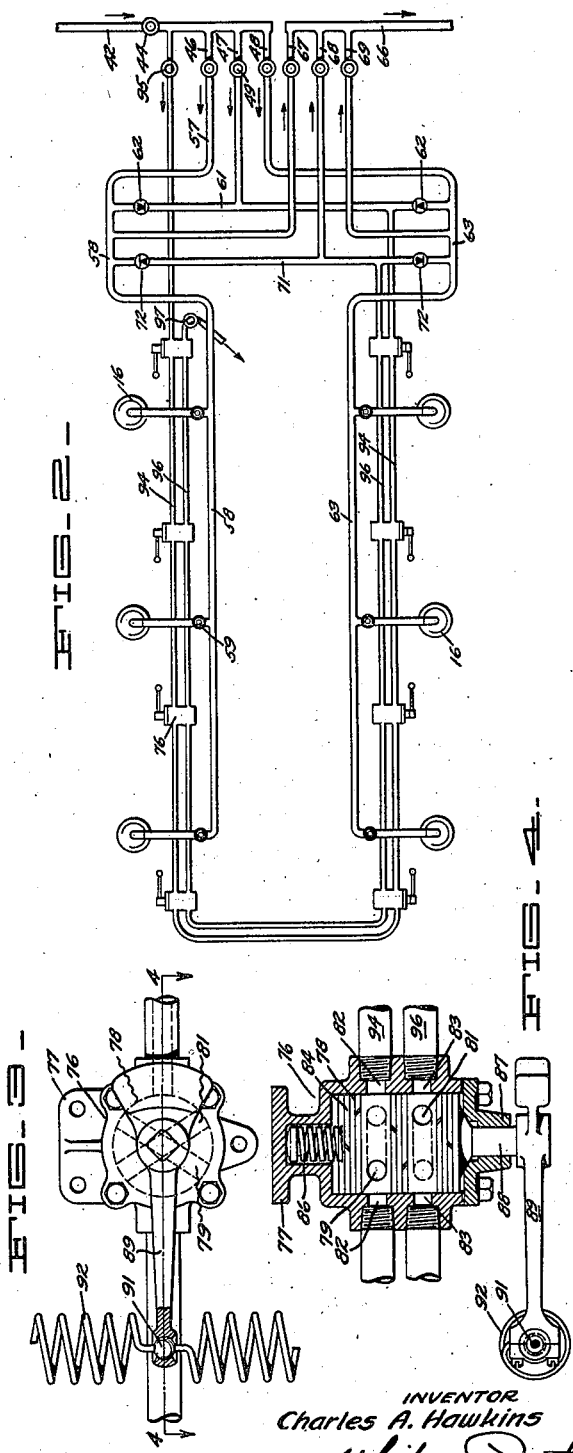
INVENTOR
Charles A. Hawkins
HIS ATTORNEYS

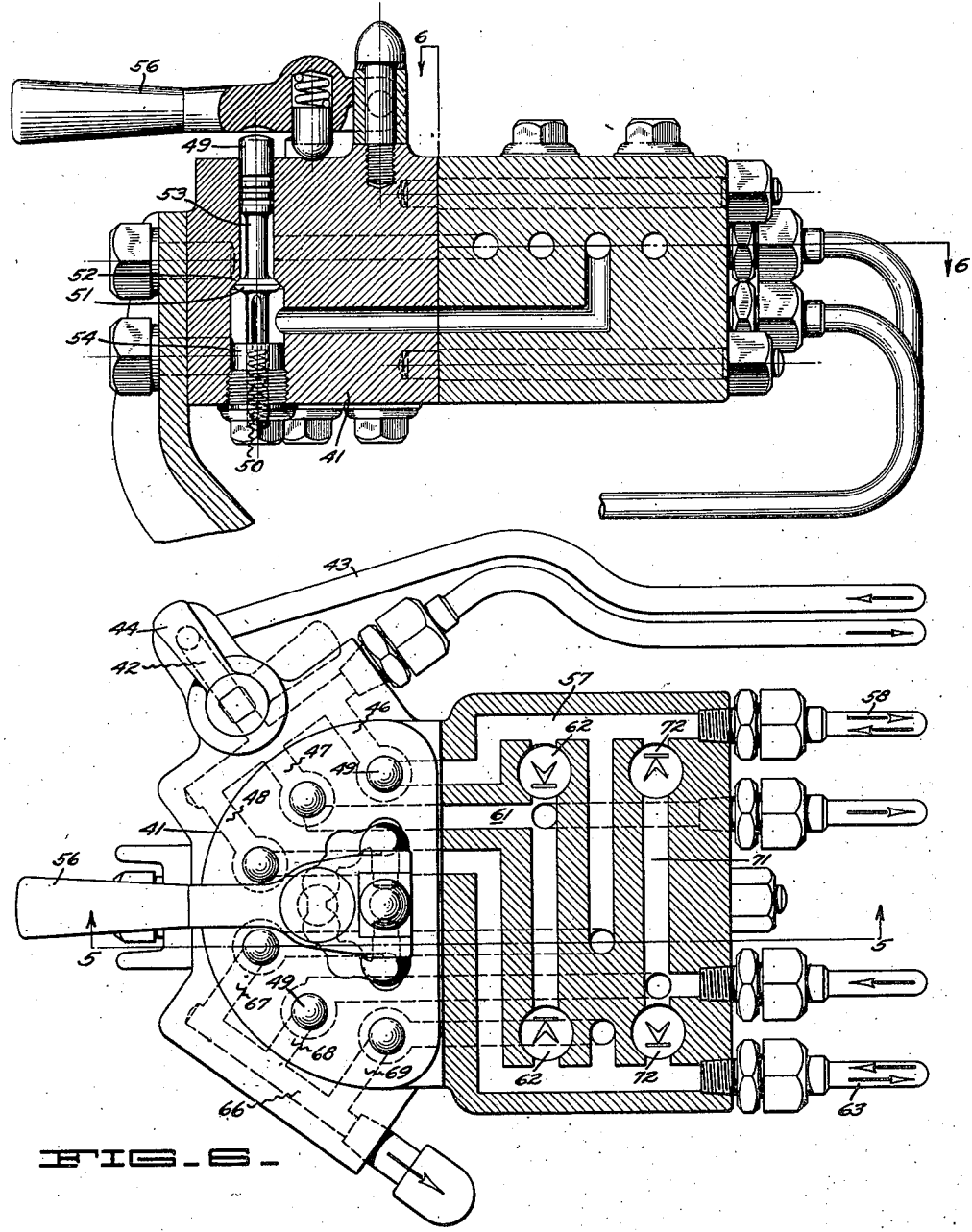

Patented July 23, 1929.

1,721,732

UNITED STATES PATENT OFFICE.

CHARLES A. HAWKINS, OF SAN FRANCISCO, CALIFORNIA.

VEHICLE SUSPENSION.

Application filed May 27, 1926. Serial No. 111,991.

My invention relates to vehicles in which all or a portion of the vehicle frame is supported on wheels by pneumatic means and refers more particularly to vehicles having at least six wheels and which are provided with two or more of such pneumatic devices suitably interconnected. An example of the type of vehicle especially referred to is shown in my co-pending patent application for a motor vehicle, Serial Number 85,863, which was filed on February 4, 1926. The suspension system of my invention is applicable to all types of land vehicles. It may advantageously be embodied in automotive vehicles designed to carry heavy loads, such as motor trucks or trailers, or it may equally well be employed in a light vehicle principally intended for passenger carrying purposes. For convenience in description, I shall consider primarily the adaptation of my invention to a motor lorry or automobile truck.

In my co-pending patent application, I described a motor vehicle in which the main frame was carried on trucks comprising a plurality of pairs of wheels. The objects of such construction are to lessen the load borne by each wheel so that heavy total loads might be carried at high speed with a minimum or no damage to the roadway, and to support the frame at a large number of points in order to reduce the length of the unsupported portions. It is of paramount importance in such a vehicle that the load on the main frame be distributed equally to the various wheels or in some other desired proportion to give the best results. For accomplishing the requisite load distribution, the wheels were joined in pairs by axles of the usual kind and each pair of wheels was connected to the main frame by pneumatic devices. The devices comprised cylinders mounted on the main frame and in which pistons were fitted. The pistons were attached directly to the axles or to interposed springs or supporting beams. The result in any case was a reciprocatory movement of the pistons in their respective cylinders in accordance with the movement of the wheels due to road irregularities. The movement of the pistons caused the displacement of air contained in the cylinders which was permitted to interflow between certain of the cylinders to effect the proper load distribution. Means were provided for introducing or educing air from the entire pneumatic suspension system at the option of the vehicle operator. The possibility arose, however, that if the supply or release of air were not given attention, the pistons might work in their extreme positions in the pneumatic cylinders under the influence of very heavy or very light loads and might cause damage to the cylinders and pistons or to other portions of the apparatus.

In accordance with the present invention, means are provided in the type of pneumatic vehicle suspension described for preventing all of the pistons from simultaneously working in their extreme positions in the pneumatic cylinders, for automatically adjusting the air in the cylinders to the load being carried by the main frame, and for permitting manual adjustment of the air in the pneumatic cylinders.

An object of the invention is to provide a vehicle suspension system of the pneumatic type in which the quantity of the air in the pneumatic supports is varied in accordance with the load on the vehicle.

Another object of the invention is to provide a pneumatic suspension system in which the supporting means or pneumatic cylinders are automatically prevented from all working simultaneously in their extreme positions.

Another object of the invention is to provide a pneumatic suspension system in which the pneumatic supports are automatically supplied with the proper amount of air at all times.

Another object of the invention is to provide a pneumatic suspension system in which road inequalities do not affect the regulation of the air pressure in the pneumatic cylinders.

Another object of the invention is to provide a pneumatic suspension system in which the quantity of the air in the pneumatic supports may be manually varied.

Another object of the invention is to provide a pneumatic suspension system in which air may be supplied to or released from two groups of pneumatic devices simultaneously, but in which interflow of air betwen said groups of pneumatic devices is prevented.

A further object of the invention is to provide a pneumatic suspension system in which fore and aft and lateral pitching or tilting of the vehicle is permitted, but in which the vehicle is subsequently returned to normal position.

The invention possesses other advantageous features, some of which with the foregoing will be set forth at length in the following description where I shall outline in full that form of the vehicle suspension of my invention which I have selected for illustration in the drawings accompanying and forming part of the present specification. In said drawings, I have shown one form of vehicle suspension embodying my invention, but it is to be understood that I do not limit myself to such form since the invention as set forth in the claims may be embodied in a plurality of forms.

In the drawings:

Fig. 1 is a side elevation of a vehicle embodying my invention, the wheels on the near side of the vehicle being removed to make the showing clearer.

Fig. 2 is a diagrammatic plan of the piping arrangement used in connection with my vehicle suspension system.

Fig. 3 is a plan of one of the automatic valves used to control the flow of air to and from the pneumatic supports.

Fig. 4 is a sectional view, portions being in plan, of the valve shown in Fig. 3, the plane of section being indicated by the line 4—4 of Fig. 3.

Fig. 5 is a cross section of the manual valve block, the plane of section being indicated by the line 5—5 of Fig. 6.

Fig. 6 is a plan view of the manual valve block shown in Fig. 5, the portion of the block which contains the check valves being shown in section, the plane of the section being indicated by the line 6—6 of Fig. 5.

Broadly speaking, the vehicle suspension of my invention preferably comprises a plurality of pneumatic cylinders or supports which are provided with means whereby they may be operated under quantities of air which may be varied with the vehicle load and which are variable by manual means as well as by automatic devices.

In the vehicle shown in the drawings, in which the present form of my invention is embodied, the main frame 6 which supports the load-carrying body (not shown) rests at its forward end upon a pair of wheels 7 connected by an axle 8 of the usual type and at its rear end is suitably supported by at least two pairs of wheels 9. In the present instance, four pairs of wheels make up the group carrying the rear end of the frame 6 in order that the load on the frame may be distributed over a large number of road contactors and may create but a small bearing pressure on the individual wheels. It is to be understood that the number of pairs of wheels utilized may be varied with conditions, and that I am not limited to any specific number of pairs of supporting wheels.

Each wheel of the pairs of wheels 9 is mounted at the end of a suitable axle 11. The axles 11 are joined preferably by means of semi-elliptic leaf springs 12 and 13. The springs 12 are pivotally mounted at their outer ends on the fore and aft axles 11 and are shackled to the two central axles 11 by means of spring shackles 14 of the conventional kind. The springs 13 are shackled at both ends to the two central axles 11. The springs 12 and 13 are not directly attached to the main frame 6 but are secured thereto by interposed pneumatic devices 16. In the vehicle shown, having eight wheels in the rear group, six pneumatic supporting devices are preferably used and are so spaced on the frame with respect to the pairs of wheels that the load can be evenly distributed over the entire group of wheels, and the frame is supported at a large number of spaced points. Three of the pneumatic devices are mounted on each side of the frame with the middle pneumatic support 16 directly over the central portion of the spring 13 spanning the two central axles 11 of the rear group and with the pneumatic devices 16 at the front and rear of the middle device 16 spaced toward the fore axle 11 and the aft axle 11, respectively, a sufficient amount to give an equal distribution of the load.

Any requisite number of the axles 11 may be drive axles but in any event all of the axles of the rear group are preferably positioned with respect to the frame 6 by means of radius rods 17 and transverse rods 15 which are suitably affixed to the axles 11 and are mounted on the frame by universal connections. In the present instance, the two central axles 11 are drive axles and are provided with housings 18 for the differential and drive mechanisms which are connected thru drive shafting 19 to the power plant 21 at the forward end of the frame 6.

In order that the vehicle may be steered, all of the wheels 7 and 9 are preferably made dirigible on the ends of axles 8 and 11. If it is desired one of the pairs of wheels may be non-dirigible with equally good results providing that the steering linkage of the remaining wheels is properly proportional. Alternatively, two preferably adjacent pairs of wheels may be non-dirigible with the flexibility of the pneumatic tires being depended upon to permit the necessary differences in motion. In any case, the wheels of each dirigible pair are connected by means of a tie rod 22 of the conventional kind. The tie rods are connected by means of suitable drag links 23 to depending arms 24 which rotate in unison with a longitudinal steering shaft 26 suitably journalled on the side of the main frame 6. The proportions of the various links of the steering apparatus and especially of the depending arms 24 on the longitudinal steering shaft 26 are such that all of the dirigible wheels of the vehicle may be suitably steered the proper amount to turn the vehicle about a central point. On account of the weight of the vehicle, it is considered advisable to provide a power operated apparatus for rotating the longitudinal steering shaft 26. Power steering devices are well known in the art and are available in a number of excellent forms. The preferred form shown in the drawings comprises a cylinder 27 mounted on the side of the frame 6 and in which a movable piston 28 is fitted. The piston is attached to the longitudinal steering shaft 26 and rotates the shaft in accordance with the piston movement. Means are provided for utilizing the power of the engine 21 to reciprocate the piston 28 in the cylinder 27. A gear pump 29 forces oil to a suitable chamber containing valves (not shown) controlled by the manually operated steering wheel 31. The valves are arranged to govern the flow of oil thru oil pipes 32 and 33 which communicate with the opposite ends of the cylinder 27. Movement of the steering wheel 31 causes a corresponding flow of oil to the proper end of the cylinder 27 and effects a displacement of the piston 28. The steering shaft 26 is rotated and the various dirigible wheels 7 and 9 are properly steered. In that manner, all of the wheels of the vehicle are steered by power developed from the vehicle engine and the effort required of the vehicle operator is negligible.

An air pump 34 is mounted on the vehicle engine 21 and is of sufficient capacity to supply air for the pneumatic supporting devices 16. The air pump preferably discharges compressed air into a reservoir or tank 36 suitably mounted on the vehicle frame 6. The usual safety and pressure regulating valve 37 may be provided on the air reservoir to maintain the air contained therein at any desired pressure. The air from the reservoir 36 may be conducted to the pneumatic devices 16 in a variety of ways but there are sundry disadvantages in a pneumatic vehicle suspension which I overcome by the particular scheme of air distribution disclosed in the drawings.

It is believed to be advantageous to interconnect the individual pneumatic supports 16 to permit an unrestricted interflow of air displaced from the air cylinders by road inequalities. If, however, with an unrestricted interconnection, the vehicle frame 6 should tilt to one side, a transfer of air would take place to the supports 16 on the other side of the vehicle and the frame would remain in tilted position until an opposite extraneous force moved it to normal position. To preclude such a possibility, interconnection between the supports 16 on one side of the frame 6 with those on the other side of the frame is not permitted. A corresponding occurrence would transpire if the front axle 8 were connected to the frame 6 by means of pneumatic supports which were in free communication with the supports 16 of the rear group of wheels. A forward or backward tilt of the frame would be permitted which would require an opposite extraneous force to correct. For that reason, the supports for the front axle 8 are isolated from the supports 16 for the rear group of axles 11. While pneumatic devices may be used between the front axle 8 and the frame 6, the requirements of the present design are well met by semielliptic leaf springs 38 of the usual variety. The problem is then to distribute air to the pneumatic devices 16 which are to be permitted free fore-and-aft interflow but are not to be permitted lateral or side to side intercommunication.

Means are provided for distributing the compressed air from the air reservoir 36 to the various pneumatic supporting devices 16 in accordance with the desires of the operator of the vehicle. To accomplish this purpose, a system of piping is provided which is controlled by a number of valves contained in a valve structure mounted within easy reach of the vehicle operator. For the piping arrangement particular reference is had to Fig. 2, and for the valve structure, Figs. 5 and 6 are referred to.

The valve structure comprises a valve block 41 which is provided with suitable valves and with suitable passages so that the vehicle driver by properly manipulating certain of the valves may send the compressed air thru the proper passages to the pneumatic devices 16, or by operating others of the valves may release air previously supplied to the pneumatic devices and permit it to escape to the atmosphere. The valve block 41 is provided with a compressed air inlet 42 which is connected to the compressed air reservoir 36 by a suitable pipe 43. The inlet 42 is controlled by a hand operated cock 44 so that the compressed air reservoir may be shut off from the remainder of the system. The air inlet 42 passes the cock 44 and branches into three passages 46, 47, and 48, each of which is controlled by a suitable valve 49. The valves utilized in the valve block are all similar. They are preferably poppet valves and each comprises a valve disc 51, which is suitably beveled to seat tightly on a valve seat 52 provided in the valve block 41, and a valve stem 53 which is of a diameter to slide easily within the valve guide 54. The stems 53 of all of the valves project above the valve block 41 and are depressible by means of a handle 56 which is rotatable thru a semi-circle and can engage the projecting portions of the various valve stems. The valves 49 are normally maintained in their seated or closed position by the pressure of the air on the valve discs 51 and by springs 50.

The passage 46 of the air inlet 42 leads thru one of the valves 49 into a passage 57 which communicates directly with a pipe 58 connecting all three of the pneumatic supporting devices 16 mounted on one side of the vehicle frame 6. These three supporting devices thereby are formed into an intercommunicating group in which the air is free to flow forward and aft. A control cock 59 is provided between the pipe 58 and each supporting device 16 so that any of the devices 16 may be shut off from the remainder of the system to permit of individual regulation of the quantity of air therein. This feature becomes especially valuable in the case of damage to one of the wheels in which event the vehicle operator may manipulate the control cock 59 to exhaust the air from the corresponding pneumatic cylinder alone, thereby relieving the wheel of load. The reverse process may be effected if it is desired temporarily to increase the load on one or more wheels individually. The passage 47 of the air inlet 42 passes thru another of the valves 49 and merges with a transfer passage 61 which is provided at each end with a check valve 62. The check valves 62 are designed to allow the air to pass from the passage 47 into the pipe 58 leading to one group of supporting devices 16, and into a similar pipe 63 which connects with the other three supporting devices 16 on the other side of the vehicle frame 6 and which forms them into another intercommunicating group. While the check valves 62 permit air to flow into both groups of supporting devices simultaneously, they prevent interflow of air from one group of devices to the other group. The check valves 62 therefore fulfill the requirement that while there may be fore and aft communication within the group of pneumatic devices, there must not be lateral or side to side interflow. The passage 48 leads thru a valve 49 to the pipe 63 which communicates with the second group of supporting devices 16.

The valve block 41 is also provided with a similar group of outlet valves 49 which control outlet passages 67, 68, and 69 communicating with the atmosphere. The outlet passage 67 which is controlled by one of the poppet valves 49, leads into the pipe 58 connected to the first group of supporting devices 16 and when the valve is open permits air to flow from that group thru the passage 66 to the atmosphere. The outlet passage 68 is controlled by another of the valves 49 and opens into a transverse passage 71 provided with a pair of check valves 72. On the other side of the check valves 72, the transverse passage 71 opens into the pipes 58 and 63 connected to the two groups of supporting devices. The check valves 72 permit fluid flow into the transverse passage 71 and thence to the outlet passage 68, but they do not permit interflow of fluid between the two groups of supporting devices. The passage 69 opens into the pipe 63 leading to the second group of supporting devices and permits air to be released from that group of supporting devices alone and discharged into the atmosphere.

In the operation of the manual air controlling means, the operator of the vehicle rotates the handle 56 to the desired one of the six positions and forces the handle downward. The stem 53 of one of the valves 49 is engaged and the valve is forced from its seat. The amount which the valve is unseated controls the amount of air passing thru the associated passage and the operator may regulate the flow as he desires. The position of the frame 6 with respect to the wheels 9 affords an indication of the air regulation required or obtained but in addition to such indication, pressure gauges 50 or distance gauges 55 may be fitted. By properly positioning the handle 56, the operator may employ any one of six optional ways of controlling the air in the pneumatic devices. Air may be supplied to one group of devices singly, it may be supplied to another group of devices singly, or it may be supplied to both of the groups together. In addition air may be released from one of the groups of devices singly, it may be released from the other of the groups of devices singly, or it may be released from both of the groups of devices together.

It is intended that the operator of the vehicle shall adjust the amount of air contained in the various supporting devices in accordance with the load carried by the vehicle. When a heavy load is carried, relatively large amounts of air should be admitted to the various supporting devices and when the load is light some of the air should be released from the pneumatic devices if necessary. In addition, the operator may regulate the manual pneumatic controls to permit the two groups of devices to contain unequal quantities of air to compensate for unequal loads on the vehicle and to counteract excessive tipping due to crowned roads. The manual control of the air in the pneumatic devices affords a means by virtue of which the riding qualities of the vehicle are not deleteriously affected by a surplus of air in the supporting devices when the load is light, and the supporting devices are not subject to damage by permitting the pistons to come into contact with the heads of the cylinders when the load is heavy.

The operator, however, is not infallible and in addition to the manually controlled means for supplying air to the supporting devices, it is considered advisable to provide automatic means which will prevent the pistons in the pneumatic cylinders from operating in either extreme upper or extreme lower portions of their range of movement. These means are also so designed that they will automatically regulate the amount of air in the pneumatic devices in accordance with the load placed upon the vehicle.

The distance between the main frame 6 and the axles 11 or the wheels varies with the load when the vehicle is stationary. A heavy load placed upon the frame 6 causes a marked but substantially uniform deflection of the frame toward the wheels, while a light load causes merely a slight deflection of the frame. When the vehicle moves over a roadway, the irregularities in the road surface cause the individual wheels to move various amounts both toward and from the frame. Under such conditions it is only the mean or average distance between the frame and wheels which is substantially constant and which varies only with the load on the vehicle. Control means are provided which are responsive to the mean distance between the frame 6 and the wheels 9 for controlling the flow of air to and from the pneumatic devices. In order that only a uniform movement or uniform change in distance between the frame 6 and all of the wheels 9 will be effective in varying the amount of air in the pneumatic devices, a plurality of control valves are fitted, each of which is responsive to the mean distance between its associated axle and the frame and which are all connected in series to regulate the flow of air to and from the pneumatic devices. The arrangement obviates the possibility of irregularities in the road surface actuating the control valves and continually changing the amount of air contained in the supporting devices. Only an increased or decreased load, which produces a substantially uniform movement of the frame toward or away from all of the axles, operates all of the serially connected control valves and permits a change to be made in the amount of air in the pneumatic devices.

Each of the control valves 76 preferably comprises a valve casing which is cylindrical and which is attached to the vehicle frame 6 by suitable means 77. Within the cylindrical valve casing a cylindrical valve 78 is situated and is adapted to be rotated. The valve is provided with two diametric passages 79 and 81 which are spaced from each other axially and angularly and which register with two ports 82 and 83 located in the valve casing. Rotation of the cylindrical valve 78 in one direction brings the passage 79 into registry with the ports 82 while rotation of the valve 78 in the opposite direction brings the passage 81 into registry with the ports 83, and the location of the diametric passages is preferably such that several degrees of rotation of the valve 78 are necessary before the passages begin to come into registry with their respective ports. Suitable packing rings 84 are provided on the periphery of the valve 78 in order to prevent leakage, and a coil spring 86 is seated within the valve casing and presses the valve toward a conical seat on the valve cap 87 so that a tight joint is made. The valve cap 87 is provided with a journal in which the shaft 88, on which the valve 78 is mounted, can turn. The shaft 88 carries at its outer end a counterbalanced arm 89 which at one end is made spherical in order to overlie a ball 91 mounted on the intermediate portion of a coil spring 92. The coil spring 92 is held between the forked end of an arm 93 which, at its other end, is connected to the axle 11 by a ball and socket joint. By virtue of the coil spring 92 interposed between the arm 93 and the arm 89, minute variations in the distance between the axle 11 and the frame 6 are absorbed by the spring so that only the mean or average change in the distance between the axle and the frame is effective in moving the counterbalanced arm 89. It therefore becomes apparent that while minute irregularities in the road surface will not operate to cause the valve 76 to rotate, major movement of the axle 11 toward or away from the frame 6 will compress the proper portion of the spring 92 and will cause the arm 89 to rotate the valve 78 to bring one or the other of passages 79 and 81 into registry with its respective port 82 or 83. All of the ports 82 are connected in series by a conduit 94 which connects at one end with the air inlet 42 in the valve block 41, thru an interposed cock 95, and at the other end with the transverse passage 61, between the check valves 62. The corresponding ports 83 are connected in series by a conduit 96 which at one end opens to the atmosphere thru a suitable cock 97 and at the other end merges with the transverse passage 71 between the check valves 72. When the load on the vehicle has been changed sufficiently to cause the frame 6 to move either toward or away from the axles 11 a substantial amount, such uniform movement will cause all of the valves 76 to be actuated, and all of the ports 82 or 83 will be opened by the passages 79 or 81, permitting the air to discharge from the pneumatic devices 16 or to flow from the air reservoir 36 into the devices. The cocks 95 and 97 may be operated together by the vehicle driver to isolate the automatic control valves, or they may be operated individually, if desired. The connection of the control valves in series in considered to be an important part of my invention since such connection prevents fore-and-aft or lateral tilting of the vehicle from operating the control valves to change the amount of air in the supporting devices.

In considering the operation of my vehicle suspension, it may conveniently be assumed that the vehicle has been operating with a certain load and that the load has been materially increased, but that the vehicle driver has neglected to operate the manual controls to introduce sufficient additional air into the supporting devices to make up for the increased load. Under the given circumstances, the increase of load produces a uniform movement of the main frame toward the vehicle axles and wheels. The movement of the frame toward the wheels causes the control valves to be rotated, thru the intermediary of the arms 93 and the arms 89, and produces a sufficient rotation of all of the control valves to bring the passages 79 into registry with the ports 82. Inasmuch as the control valves are arranged serially, it is necessary that they all be moved sufficiently to permit of an uninterrupted passage thru the air supply conduit 94. Upon the opening of the passages 79 in all of the automatic valves 76, air is permitted to flow from the air reservoirs 36, thru the air supply conduit 94 and all of the valves 76 in turn until it comes to the transverse passage 61 in the valve block 41. In the passage 61 the air passes thru the two check valves 62 and flows to both of the groups of supporting devices, adding to the supply of air in them. The addition of air to both of the groups of supporting devices causes the pistons therein to be forced outwardly and raises the frame 6 of the vehicle. The movement of the main frame 6 away from the axles 11 rotates the valves 76, thru the intermediary of the arms 89 and the arms 93, sufficiently to move the passages 79 out of registry with the ports 82 and interrupts the air flow thru the air supply conduit 94. The amount of air remaining in the supporting devices after the closure of the conduit 94 is such that the increased load may be carried without having the pistons operate in either the inner or the outer extreme positions.

If still more load is placed on the vehicle frame, the automatic valves will again be actuated to permit the influx of additional air under pressure to the two groups of supporting devices. The resulting movement of the pistons will again cause the automatic valves to shut off the air when the proper amount has been admitted to the pneumatic devices. Any relative movement between the various axles and the main frame due to road inequalities will not operate to change the quantity of air in the supporting devices since all of the automatic valves must be actuated simultaneously to produce an uninterrupted passage thru the supply conduit 94. Such an occurrence is extremely unlikely to transpire, but if, in an exceptional instance, it should happen, the sole effect would be to admit slightly more air to the supporting devices. Such additional air is necessarily minute in quantity and is not deleterious.

When the load on the vehicle is materially decreased a uniform movement takes place between the main frame and the vehicle axles which opens the series of automatic valves 76 thru the medium of the arms 89 and the arms 93. When the valves have been sufficiently rotated, the passages 81 register with the discharge conduit 96 and air is permitted to flow from both groups of pneumatic cylinders past the check valve 72 into the transverse passage 71 and out thru the series of valves 76 to the atmosphere. The efflux of air takes place until the vehicle frame again approaches its normal distance from the supporting axles at which time automatic valves 70 are returned to their intermediate or normal position with both the passages 79 and 81 out of registry with the ports 82 and 83. There is then the proper quantity of air in the pneumatic devices.

It will be appreciated that all major differences in load will be compensated for by the operation of the automatic valves which will correspondingly change the amount of air in the supporting devices, but in the main, it is believed preferable to manipulate the manually controlled valve to supply the pneumatic supporting devices with the proper amount of air. The automatic valves are provided principally to take care of any excessively heavy or excessively light loads which are not compensated for by the vehicle operator.

I claim:

1. In a vehicle, a wheel, a frame, a co-operating pneumatic cylinder and piston for supporting said frame on said wheel, and means, ineffective when said piston is operating in the intermediate portion of its range, for controlling the flow of air to and from said cylinder when said piston is operating in the extreme portions of its range.

2. In a vehicle, a wheel, a frame, a co-operating pneumatic cylinder and piston for supporting said frame on said wheel, and means for controlling the flow of air to and from said cylinder in accordance with the portion of its range within which said piston is working, said means being affected only by changes in the mean position of said piston.

3. In a vehicle, a wheel, a frame, a source of air under pressure, a co-operating pneumatic cylinder and piston for supporting said frame on said wheel, and means affected only by changes in the mean position of said piston for controlling the flow of air into and out of said cylinder when said piston is in the extreme portions of its range.

4. In a vehicle, a wheel, a frame, a co-operating pneumatic cylinder and piston for supporting said frame on said wheel, a valve for controlling the influx of air to said cylinder, a second valve for controlling the efflux of air from said cylinder and means for actuating said valves in accordance with the mean variation of the position of said piston within said cylinder.

5. In a vehicle, a wheel, a frame, a co-operating pneumatic cylinder and piston for supporting said frame on said wheel, a valve for controlling the influx of air to said cylinder, a second valve for controlling the efflux of air from said cylinder, means for operating said first-named valve when said piston is operating in one extreme portion of its range and for operating said second valve when said piston is operating in the other extreme portion of its range, and means causing said operating means to be effective only upon variations in the mean position of said piston.

6. In a vehicle, a wheel, a frame, a co-operating pneumatic cylinder and piston for supporting said frame on said wheel, means for controlling the flow of air to and from said cylinder, said means including a ported cylindrical casing provided with a correspondingly ported rotatable valve body, and a connection for actuating said means, said connection including a spring for absorbing motion between said wheel and said controlling means.

7. In a vehicle, a plurality of wheels, a frame, springs connecting some of said wheels and said frame, and interconnected pneumatic devices connecting others of said wheels and said frame.

8. In a vehicle, a plurality of pairs of wheels, a frame, springs supporting one end of said frame on a pair of said wheels, and interconnected pneumatic devices for supporting the other end of said frame on other pairs of said wheels.

9. In a vehicle, a plurality of pairs of wheels, a frame, interconnected pneumatic devices for connecting some of said pairs of wheels to said frame, and springs connecting at least one of said other pairs of wheels to said frame.

10. In a vehicle, a plurality of pairs of wheels, a frame, springs connecting at least one of said pairs of wheels to said frame at one side of the center of said frame, pneumatic devices connecting a plurality of the others of said pairs of wheels to said frame, and means permitting free fore and aft communication between said pneumatic devices.

11. In a vehicle, a frame, a pair of wheels at one end of said frame, a resilient means connecting said pair of wheels to said frame, a plurality of pairs of wheels grouped at the other end of said frame, pneumatic devices on both sides of said frame for connecting said pairs of wheels to said frame, means permitting communication between said pneumatic devices on one side of said frame, and means permitting communication between said pneumatic devices on the other side of said frame.

12. In a vehicle, a frame, a plurality of pairs of wheels, pneumatic devices connecting said pairs of wheels to said frame, means permitting fore and aft communication between said pneumatic devices whereby said frame can tilt from normal position, and means for restoring said frame to normal position.

13. In a vehicle, a frame, a plurality of pairs of wheels, pneumatic devices connecting said pairs of wheels to said frame, and a plurality of valves operative in series for controlling the flow of air to said pneumatic devices.

14. In a vehicle, a frame, a plurality of pairs of wheels, pneumatic devices connecting said pairs of wheels to said frame and a plurality of valves responsive to the mean distance between said pairs of wheels and said frame and operative in series for controlling the flow of air to said pneumatic devices.

15. In a vehicle, a frame, a plurality of wheels, axles joining said wheels in pairs, pneumatic devices for supporting said frame on said axles, a valve associated with each axle and responsive to the mean distance between its associated axle and said frame, and a conduit connecting all of said valves in series for controlling the flow of air to said pneumatic devices.

16. In a vehicle, a frame, a plurality of wheels, pneumatic devices for supporting said frame on said wheels, and a plurality of valves controlling in series the flow of air to said pneumatic devices in multiple.

17. In a vehicle, a frame, a plurality of wheels, pneumatic devices for supporting said frame on said wheels, a valve associated with each of said wheels and responsive to the mean distance between its associated wheel and said frame, and means controlled by said valves in series for permitting the flow of air to said pneumatic devices in multiple.

18. In a vehicle, a frame, a plurality of wheels, pneumatic devices for supporting said frame on said wheels, means for automatically controlling the flow of air to and from said devices, and means manually operated for controlling the flow of air to and from said devices.

19. In a vehicle, a frame, a plurality of wheels, pneumatic devices for supporting said frame on said wheels, automatic means for controlling the flow of air to and from said devices, and means manually operated for by-passing said automatic means.

20. In a vehicle, a frame, a plurality of wheels, pneumatic devices arranged on one side of said frame for supporting said frame on said wheels, pneumatic devices on the other side of said frame for supporting said frame on said wheels, means for permitting fluid flow to and from all of said devices in multiple, and means for preventing interflow of fluid between the devices on one side of said frame and the devices on the other side of said frame.

21. In a vehicle, two groups of interconnected pneumatic devices, means for permitting fluid flow to and from both of said groups in multiple, and means for preventing interflow of fluid between said two groups.

22. In a vehicle, a group of interconnected pneumatic devices, a second group of interconnected pneumatic devices, means for supplying air to said groups singly, means for supplying air to said groups together, and means for preventing interflow of air between said groups.

23. In a vehicle, a group of interconnected pneumatic devices, a second group of interconnected pneumatic devices, means for releasing air from said groups singly, means for releasing air from said groups together, and means for preventing interflow of air between said groups.

24. In a vehicle, a group of interconnected pneumatic devices, a second group of interconnected pneumatic devices, manually operated means for supplying air to said first group, manually operated means for supplying air to said second group, manually operated means for supplying air to both of said groups, manually operated means for releasing air from said first group, manually operated means for releasing air from said second group, manually operated means for releasing air from both of said groups, and means for preventing the interflow of air between said groups.

25. In a vehicle, a group of interconnected pneumatic devices, a second group of interconnected pneumatic devices, a single valve for admitting air to said first group, a single valve for admitting air to said second group, a single valve for admitting air to both of said groups together, a single valve for releasing air from said first group, a single valve for releasing air from said second group, a single valve for releasing air from both of said groups together, and means for preventing the interflow of air between said groups.

26. In a vehicle, a group of interconnected pneumatic devices, a second group of interconnected pneumatic devices, a conduit connecting said groups of devices, an outlet from said conduit, and check valves in said conduit interposed between each of said groups of devices and said outlet whereby fluid may flow from both of said groups simultaneously to said outlet but interflow between said groups is prevented.

27. In a vehicle, a group of interconnected pneumatic devices, a second group of interconnected pneumatic devices, a conduit connecting said groups of devices, a second conduit connecting said groups of devices, an outlet from said first conduit, an inlet to said second conduit, and check valves in both of said conduits between said inlet and said outlet, respectively, and said groups of devices whereby fluid can flow from both of said groups simultaneously to said outlet and can flow to both of said groups simultaneously from said inlet but interflow between said groups is prevented.

28. In a vehicle, a frame, a plurality of wheels, a group of interconnected pneumatic devices, a second group of interconnected pneumatic devices, said devices supporting said frame on said wheels, a conduit connecting said groups of devices, a second conduit connecting said groups of devices, an outlet from said first conduit, an inlet to said second conduit, check valves between said inlet and said outlet, respectively, and said groups of devices, and means responsive to the mean distance between said frame and said wheels for controlling the efflux of air from said first conduit and the influx of air to said second conduit.

29. In a vehicle, a frame, a plurality of wheels, a group of interconnected pneumatic devices for partially supporting said frame on said wheels, a second group of pneumatic devices for partially supporting said frame on said wheels, a conduit connecting said group of devices, check valves in said conduit for preventing interflow of fluid between said groups of devices, an outlet from said conduit for permitting simultaneous efflux of fluid from said groups of devices, a second conduit connecting said groups of devices, check valves in said second conduit for preventing interflow of fluid between said groups of devices, an inlet to said second conduit for permitting simultaneous influx of fluid to said groups of devices, a plurality of valves each responsive to the mean distance between said frame and said wheels and operative in series for controlling said outlet, and a second plurality of valves each responsive to the mean distance between said frame and said wheels and operative in series for controlling said inlet.

30. In a vehicle, a frame, a pair of wheels at one end of said frame, springs for connecting said pair of wheels to said frame, a plurality of pairs of wheels at the other end of said frame, a group of pneumatic devices arranged at one side of said frame for partially supporting said frame on said last named wheels, a second group of pneumatic devices arranged at the other side of said frame for partially supporting said frame on said last named wheels, a pipe permitting fore and aft communication between said first group of pneumatic devices, a manually controlled valve for admitting air to said pipe, a second manually controlled valve for releasing air from said pipe, a second pipe permitting fore and aft communication between said second group of pneumatic devices, a third manually controlled valve for admitting air to said second pipe, a fourth manually controlled valve for releasing air from said second pipe, a conduit connecting said first and said second pipes, an outlet from said conduit, check valves in said conduit preventing interflow of fluid between said groups of pneumatic devices but permitting discharge from both of said groups of devices to said outlet, a fifth manually controlled valve for releasing air from said conduit, a second outlet in said conduit, a second conduit connecting said first and said second pipes, an inlet to said second conduit, check valves in said second conduit preventing interflow of fluid between said groups of pneumatic devices but permitting admission of fluid to both of said groups of devices from said inlet, a sixth manually controlled valve for admitting air to said second conduit, a second inlet to said second conduit, a plurality of valves responsive to the mean distance between said frame and said last-named wheels and arranged in series to control said second outlet, and a second plurality of valves responsive to the mean distance between said frame and said last-named wheels and arranged in series to control said second inlet.

31. In a vehicle, a frame, a plurality of pairs of wheels, pneumatic means connecting said pairs of wheels to said frame and a plurality of valves adapted to change the quantity of air in said pneumatic means upon simultaneous variation of said means from a predetermined mean distance between the frame and said pairs of wheels.

32. In a vehicle, a plurality of pairs of wheels, a frame, pneumatic pressure means for supporting said frame on said wheels, and automatic means effective only upon substantially uniform variations of the frame from its mean position for varying the quantity of air in said pneumatic means.

33. In a vehicle, a plurality of pairs of wheels, a frame, pneumatic pressure means for supporting said frame on said wheels, and automatic means ineffective upon variations in position of the frame due to ordinary road irregularities for varying the quantity of air in said pneumatic means.

34. In a vehicle, a plurality of pairs of wheels, a frame, interconnected pneumatic devices for supporting one end of said frame on some of said plurality of pairs of wheels, and means isolated from said pneumatic devices for supporting the other end of said frame on at least one other of said pairs of wheels.

In testimony whereof, I have hereunto set my hand.

CHARLES A. HAWKINS.